United States Statutory Invention Registration [19]

[11] Reg. Number: H657

Cameron et al. [43] Published: Aug. 1, 1989

[54] TORQUE CALIBRATOR

[75] Inventors: Roy L. Cameron, Athens; James S. Burgess, Harvest, both of Ala.

[73] Assignee: The United States of America as represented by the Secretary of the Army, Washington, D.C.

[21] Appl. No.: 239,814

[22] Filed: Sep. 2, 1988

[51] Int. Cl.[4] ..... G01C 17/38
[52] U.S. Cl. ..... 73/1 C; 73/865.9
[58] Field of Search ..... 73/1 C, 1 B, 865.9

[56] References Cited

U.S. PATENT DOCUMENTS 4,543,814 10/1985 Heilman ..... 73/1 C

FOREIGN PATENT DOCUMENTS 0664-059 6/1979 U.S.S.R. ..... 73/1 C

*Primary Examiner*—Thomas H. Tarcza
*Assistant Examiner*—Linda J. Wallace
*Attorney, Agent, or Firm*—Freddie M. Bush; James T. Deaton

[57] ABSTRACT

A torque calibrator which has a pair of torque beams with hydraulic cylinders for exerting forces on opposite ends of the torque beams and with load cells mounted at opposite ends of the beams for measuring the forces applied to the beams with the beams being designed for a torque cell to be mounted between the beams for having torque applied to the torque cell to calibrate the torque cell.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TORQUE CALIBRATOR

DEDICATORY CLAUSE

The invention described herein may be manufactured, used, or licensed by or for the government for governmental purposes without the payment to us of any royalties thereon.

BACKGROUND OF THE INVENTION

In the past, a number of torque measuring instruments have been used to measure torque up to 20,000 lbs.-ft. in both clockwise and counterclockwise modes. Proper maintenance of these units require that periodic calibration be performed. In searching to determine what torque measuring equipment is available for measuring torque, it has been revealed that there is nothing available on the market that is suitable for performing as required by applicants. Therefore, there is a need for a particular torque measuring device that can measure up to 20,000 lbs.-ft. of torque for a particular torque cell.

Accordingly, it is an object of this invention to provide a torque measuring device that is designed to measure up to 20,000 lbs.-ft. of torque using hydraulic loading means.

A further object of this invention is to provide a torque measuring device that is lighter in weight and lower in cost than the devices previously produced for making measurements of this type.

Still another object of this invention is to provide a torque measuring device that is easy to operate and requires a minimum of space.

Other objects and advantages of this invention will be obvious to those skilled in this art.

SUMMARY OF THE INVENTION

In accordance with this invention, a torque calibrator is provided that includes a frame for mounting the torque mechanism and includes a pair of parallel torque beams with each torque beam having a load cell connected at one end and a hydraulic cylinder mounted at the opposite end. A torque cell is mounted between the two beams and secured thereto for application of forces to be applied to the torque cell by the hydraulic cylinders through the torque beams. This device enables a compact and yet rugged torque calibrator to be produced that is accurate.

DESCRIPTION OF THE PREFERRED EMBODIMENT

Figure 1:
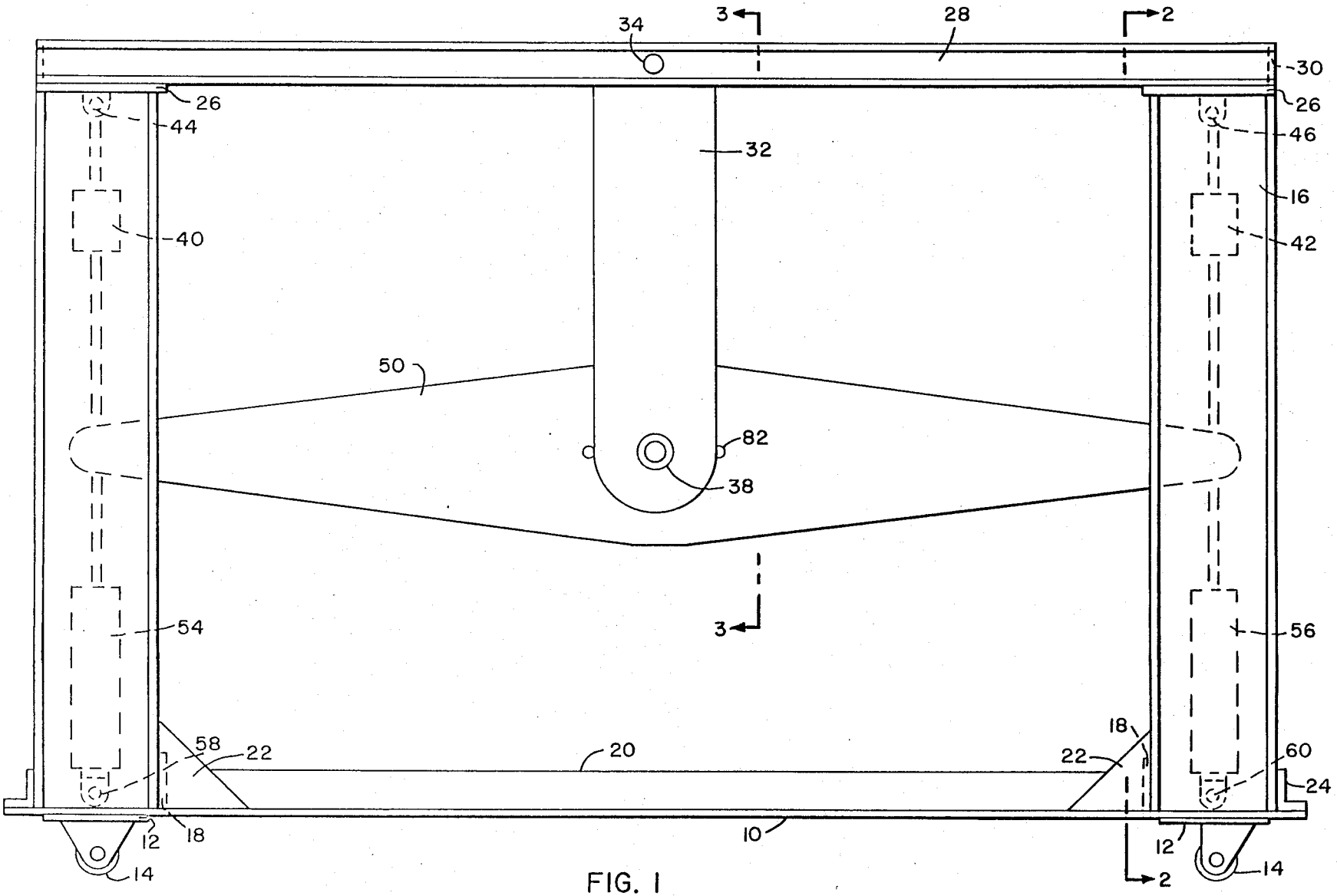
FIG. 1 is a side view of a torque calibrator in accordnce with this invention.
Figure 2:
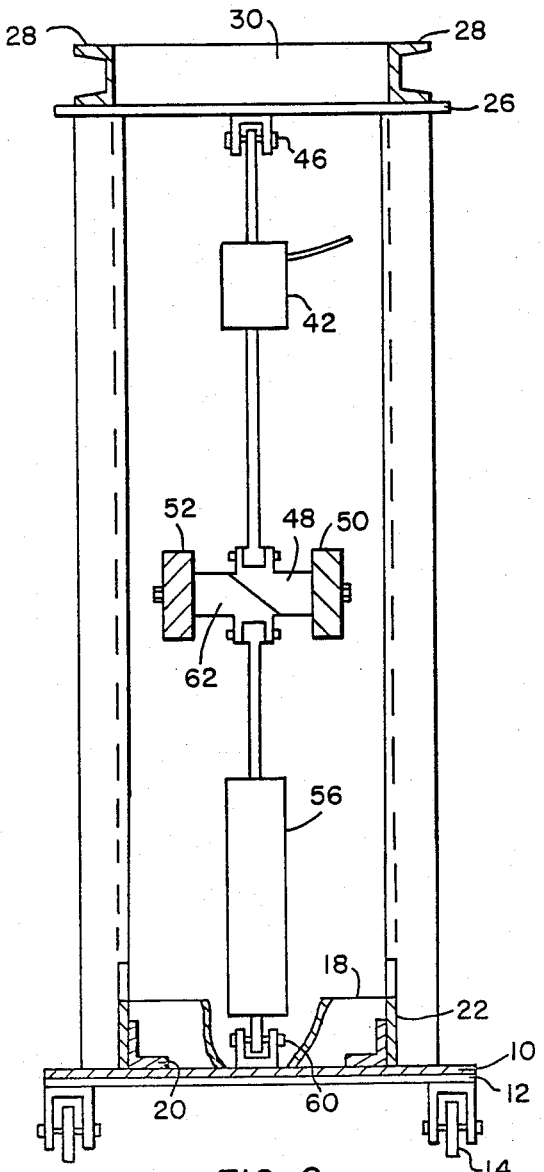
FIG. 2 is a sectional view along line 2—2 of FIG. 1 with portions cut away.
Figure 3:
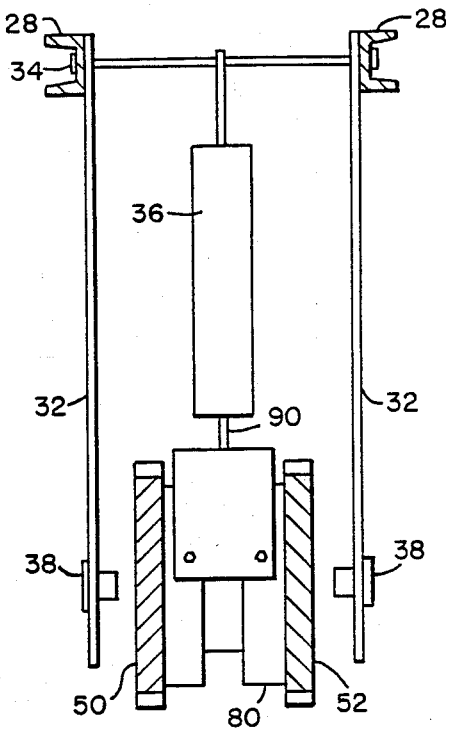
FIG. 3 is a sectional view along line 3—3 of FIG. 1.
Figure 4:
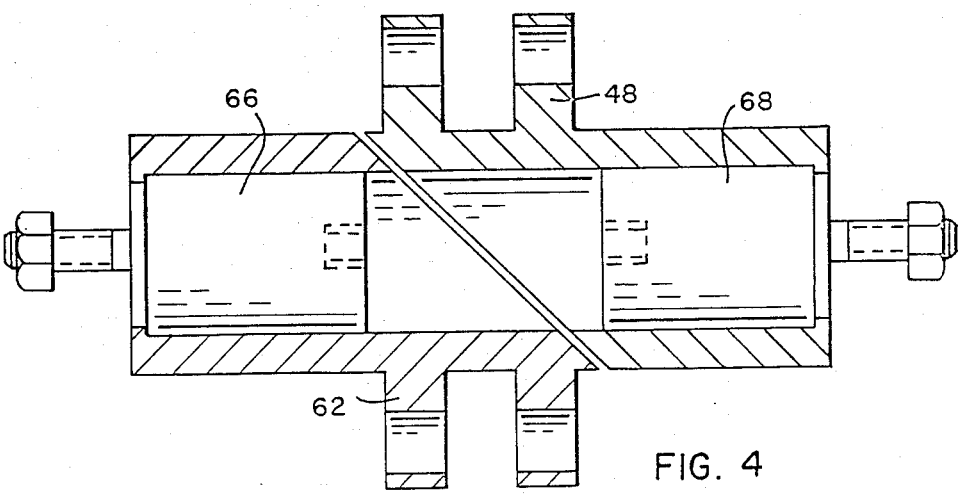
FIG. 4 is a sectional view of load attachment mechanism.

Referring now to the drawing, a torque calibrator frame includes a base plate 10 with cross members 12 at opposite ends thereof with four casters 14 for mounting the frame on rollers. Four U-shaped upright members

16 are provided with one U-shaped member 16 at each corner. U-shaped members 16 are spaced apart by plates 18 and angle arms 20 are mounted down each side to form a rectangular shape with all this structure being integrally welded together and to base plate 10. Triangular braces 22 are mounted at the four corners to give additional bracing to the structure. The outside edges of U-shaped members 16 have a L-shaped bracket 24 welded thereto and to baseplate 10 to lend additional structural support. At the top of U-shaped members 16, plates 26 are welded to the top surfaces of U-shaped members 16. Positioned on top of plates 26 are two spaced apart U-shaped beams 28 that are spaced apart by end plates 30 that are welded to U-shaped beams 28 and this total structure is welded to plates 26 to provide an integral rectangular type support structure. Each U-shaped beam 28 has a support arm 32 secured thereto such as by being welded thereto for use in mounting a torque cell. U-shaped beams 28 have a bore therethrough with a pin 34 for mounting one end of a hydraulic cylinder 36 that is used in supporting the torque cell when it is being installed. Support arms 32 have support trunnions 38 (See FIG. 5) integrally secured thereto in a conventional manner to act as supporting trunnions.

Load cells 40 and 42 are each pivoted at one end to pivot mechanisms 44 and 46. The pivots at connections 44 and 46 are a universal type connections for movement of load cells 40 and 42 relative to their connection to the frame. The other ends of load cells 40 and 42 are connected to load attachment mechanisms 48 that are located at each end of torque beams 50 and 52. The connection of load cells 40 and 42 to load attachment means 48 is by universal and pivotal connection where these inner-connect. Hydraulic cylinders 54 and 56 are each pivotably connected to the frame at 58 and 60 and the opposite ends of hydraulic cylinders 54 and 56 are attached to other halves 62 of the load attachment mechanism. It will be noted that the attachments of hydraulic cylinders 54 and 56 to halves 62 is also by a universal type pivoting connection. It is also pointed out that the axis of load cells 42 and 40 are aligned with hydraulic cylinders 54 and 56 so that the load cells are directly opposite a hydraulic cylinder that is located beneath. With this arrangement, a balanced torquing arrangement occurs. It will also be appreciated that by disconnecting and rotating or turning halves 48 and 62 180° one may apply torque in an opposite direction with torque beams 50 and 52. Load attachment halves 62 are secured to torque beam 52 by bolt means 66 and the other halves 48 are attached to torque beam 50 by bolts 68. Halves 48 and 62 are the same and are produced by cutting one piece into two halves as illustrated so that the connection flanges are exactly opposite and 180° apart. As previously stated, this enables the load attachment mechanism to be rotated 180° at each end in order to reverse the direction of torque applied by torque beams 50 and 52.

Figure 5:
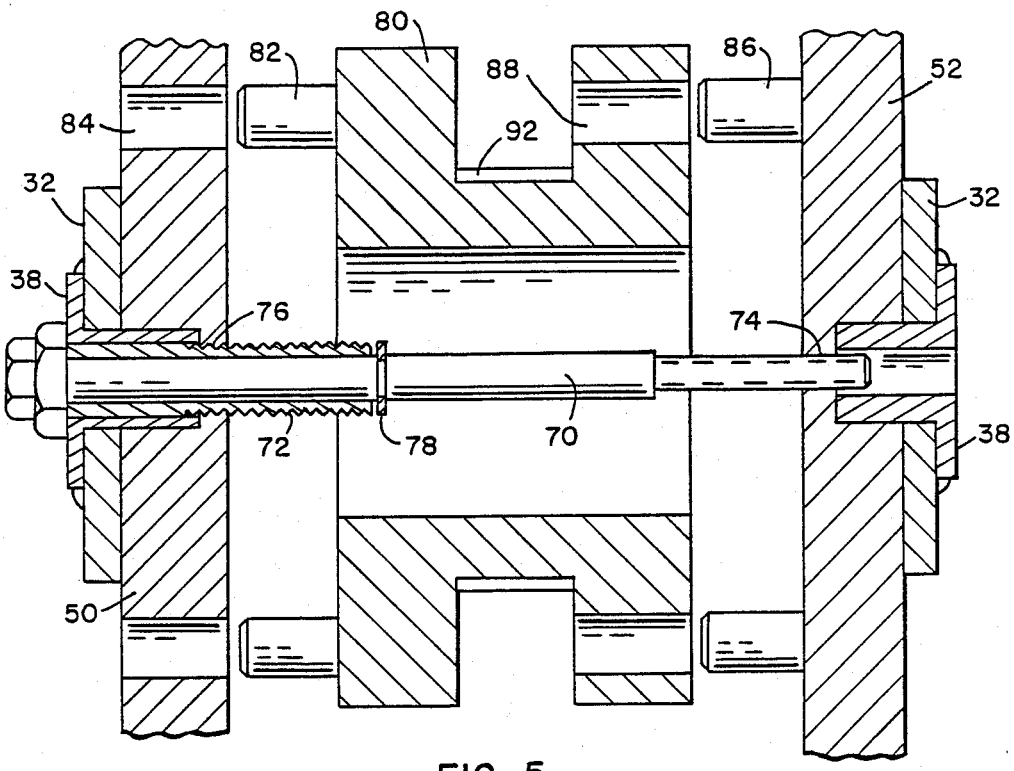
FIG. 5 is a sectional view illustrating the torque cell and the mounting of the torque cell relative to support members and the torque beams.
Figure 6:
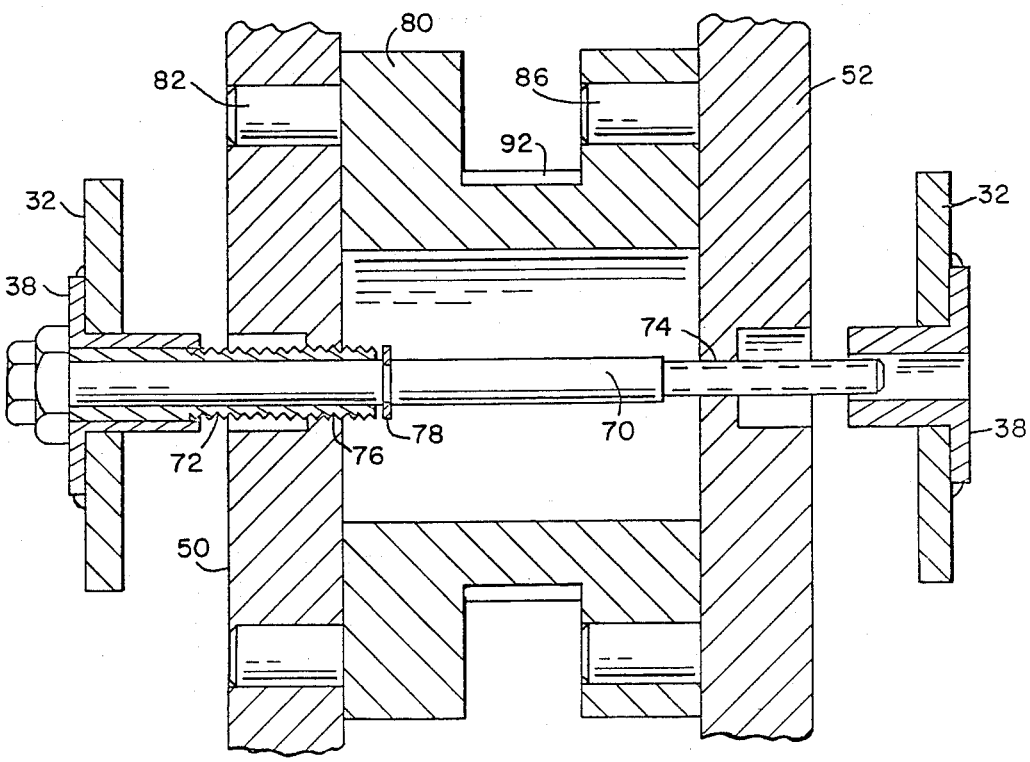
FIG. 6 is a sectional view illustrating the torque cell and the torque beams in assembled position.

Support arms 32 and trunnions 38 are used with bolts 70 and 72 (See FIGS. 5 and 6) that are threaded into torque beams 50 and 52 at 74 and 76. Threads at 74 are for example right hand threads and threads at 76 are left hand threads. Bolts 70 and 72 are mounted for rotation relative to each other and are keyed at 78 so that they move linearly substantially together. This torque calibrator is adapted for calibrating a torque cell such as torque cell 80. Torque cell 80 has pins 82 for engagement in bores 84 of torque beam 50 and torque beam 52 has integral pins 86 for engagement in bores 88 of torque cell 80. With beams 50 and 52 positioned as illustrated in FIG. 5 and with torque cell 80 positioned between 50 and 52, and with bolts 70 and 72 positioned as illustrated, by turning the heads of each of bolts 70 and 72 in the same direction for tightening, beams 50 and 52 are moved toward one another to engage pins 82 into bores 84 and pins 86 into bores 88. When torque beams 50 and 52 have been moved to the position illustrated in FIG. 6, bolts 70 and 72 are rotated in opposite directions to remove the bolts from torque beams 50 and 52 to allow torque cell 80 to be tested. This removal of bolts 70 and 72 allows torque to be applied directly to torque cell 80 for calibration thereof. When mounting torque cell 80 relative to beams 50 and 52 and when in the position illustrated in FIG. 5, torque cell 80 is connected in a conventional manner as illustrated to shaft 90 of hydraulic cylinder 36 for positioning of the torque cell relative to beams 50 and 52 for mounting of torque beams 50 and 52 relative to torque cell 80 as previously described. Torque cell 80 has conventional electronic circuitry 92 attached thereto for measuring strain applied to torque cell 80 and has an electrical lead from which a readout which is typically from 0 to 30 millivolts output. This output is proportional to the torque applied to torque cell 80. Load cells 40 and 42 likewise have electrical outputs that are converted in a conventional manner to determine the forces applied to torque cell 80. These forces produce torque at torque cell 80. This torque equals force×arm length. By knowing the torque applied to torque cell 80 at a particular reading and by comparing the particular reading with that from electronic circuitry 92 of torque cell 80, torque cell 80 may be calibrated.

It is noted that the torque calibrator described herein is adapted to apply varying torque loads to flange-type torque cells 80. The provided torque calibrator is adapted to operate as a balanced system to thus avoid side loads which have an adverse effect on the performance of precision bridge circuitry that is used in circuitry 92 of torque cell 80.

The most common way of eliminating side loads is to isolate torque cell 80 between large bearings. This is usually accomplished at considerable expense and has the disadvantage of requiring a heavy supporting structure capable of absorbing heavy side loads and bending moments. This type structure has been eliminated in applicant's device by aligning the applied and reaction forces and containing them within a relatively small and lightweight frame and is basically accomplished by using load attachment mechanism halves 48 and 62. Another significant advantage of this invention is that the device occupies only about 20% of the floor space otherwise required for a device of this nature and this device is easily made portable by the addition of casters as have been illustrated.

As will be noted, this invention allows the torque cell and torque beams as an assembly to float unaffected by side loads and unnecessary restraints. Torque cell 80 feels only the pure torque of balanced loading.

In operation, as forces are applied to the ends of beams 50 and 52 by forces applied from hydraulic cylinders 54 and 56, equal and opposite twisting moments are transmitted to the flanges of torque cell 80 to produce a reading from electronic circuitry 92. As appreciated, the torque calibrator applies the appropriate forces to torque cell 80 and the electrical outputs from the torque cell 80 and load cells 40 and 42 provide the means by which the torque applied can be calculated and the particular reading from torque cell 80 can be noted to determine the particular reading in relation to a particular torque applied.

The determination of torque produced by the forces of the torque calibrator are greatly simplified by applicants' providing of the following conditions:

A. The distribution of mass in the unloaded condition is symmetrical with respect to a vertical plane through the center of the torque cell.

B. The load points are equal distant from the above vertical plane.

C. The torque beams including the load attachment mechanisms at opposite ends are rigid to the extent that no significant bending occurs under loads.

D. The center line of the torque cell remains level during loading.

It is to be understood that the above conditions will vary slightly from the ideal. They are, however, controlled within limits that are quite satisfactory. Control of the dimensions and mass distribution of the torque beams is greatly enhanced in the fabrication process by clamping the torque beam stocks together securely and performing each cut in a single operation so that the beams are substantially identical. Overall control of all critical conditions are easily accomplished by appropriate selection of sufficient strength materials and proper use of precision machine tooling.

As will be appreciated, applicants have provided a rather unique torque calibrator that has the capability of calibrating 20,000 lbs.-ft. torque in a device that is rather small compared to conventional structures for performing this function and yet a very movable device that maintains its accuracy over time and use.

I claim:

1. A torque calibrator comprising a frame of general rectangular shape and having spaced apart upright members at opposite ends, a pair of parallel torque beams mounted in spaced relation in said frame, each torque beam having first and second ends with said first end of each beam being secured to respective hydraulic cylinders and to the frame for exerting forces at said first end of each of the torque beams, said first end of each torque beam being on an opposite side to that of the other first end, load cells connected to the respective beams at said second ends of the beams and to the frame for measuring the forces applied by the hydraulic cylinders to the torque beams, said torque beams being mounted parallel to each other by said hydraulic cylinders and said load cells, and said hydraulic cylinders and said load cells being aligned with each load cell being over a respective one of said hydraulic cylinders, and said torque beams having means thereon for having a torque cell mounted therebetween for applying torque to the torque cell when said hydraulic cylinders apply forces to the torque beams.

2. A torque calibrator as set forth in claim 1, wherein said hydraulic cylinders are connected to said torque beams through load attachment mechanisms that are divided into half sections to allow said hydraulic cylinders and said load cells to be mounted with each respective load cell of said load cells directly over a respective hydraulic cylinder of said hydraulic cylinders.

3. A torque calibrator as set forth in claim 2, wherein said load attachment mechanisms are such that each load attachment mechanism can be disconnected, rotated 180°, and then reconnected so that the forces applied by the hydraulic cylinders will apply their forces in an opposite direction to a torque cell when mounted between the torque beams.

4. A torque calibrator as set forth in claim 1, wherein said frame has support arms projecting from a top section of the frame, said support arms having trunnions thereon for supporting the torque beams before a torque cell is positioned and mounted relative to the torque beams, and said torque beams each having a threaded bore with threaded bolts that are mounted for rotation relative to each other and for being threaded in the threaded bores of the torque beams for moving the beams together or apart relative to a torque cell therebetween.

* * * * *